Figure 1:
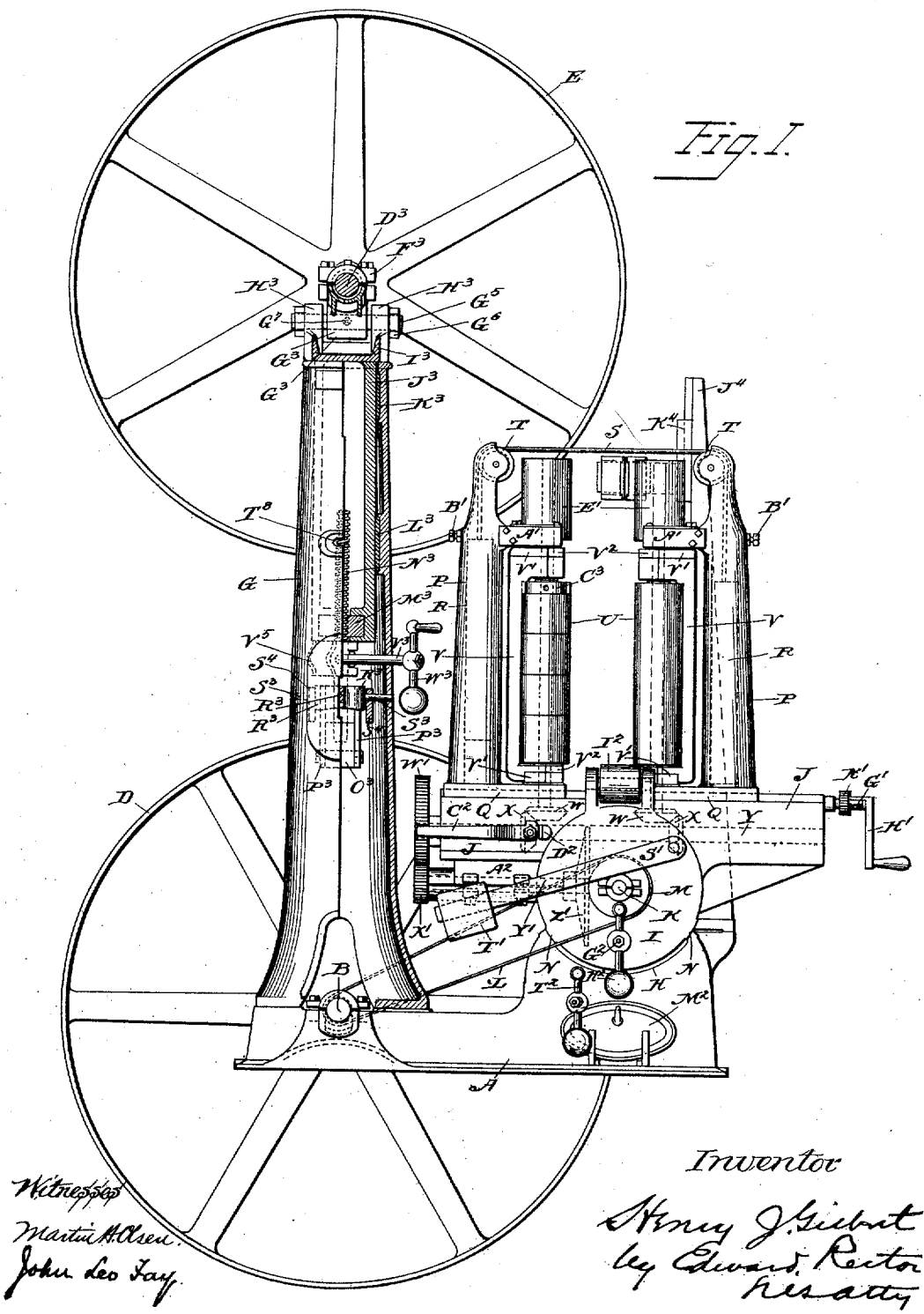

(No Model.) 10 Sheets—Sheet 1.

H. J. GILBERT.
RESAWING MACHINE.

No. 537,526. Patented Apr. 16, 1895.

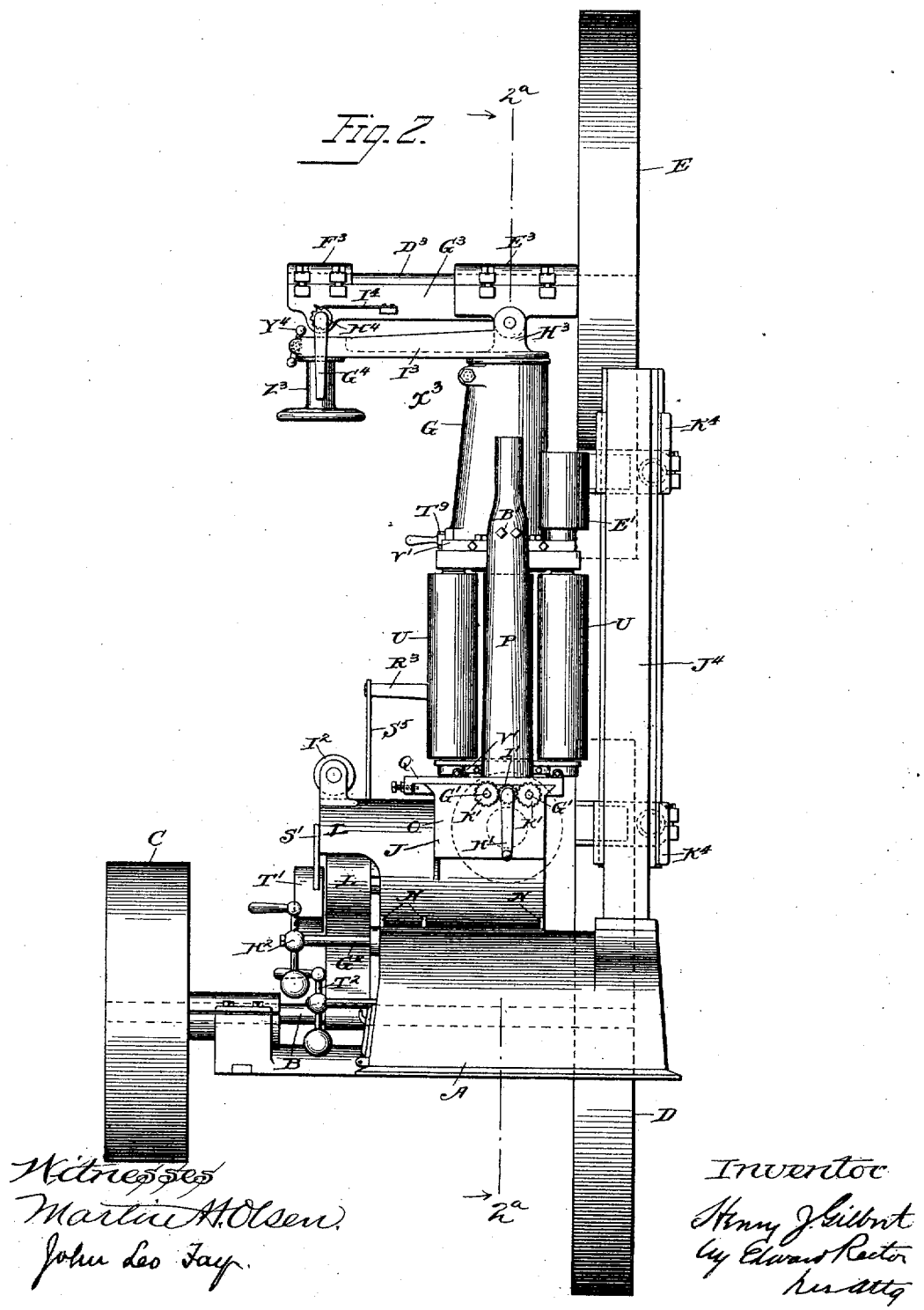

(No Model.) 10 Sheets—Sheet 3.

H. J. GILBERT.
RESAWING MACHINE.

No. 537,526. Patented Apr. 16, 1895.

Witnesses
Martin H. Olsen.
Leonora Wiseman

Inventor
Henry J. Gilbert
by Edward Rector
his atty (No Model.)　　　　　H. J. GILBERT.　　　10 Sheets—Sheet 4.
RESAWING MACHINE.
No. 537,526.　　　　　　　　　　Patented Apr. 16, 1895.
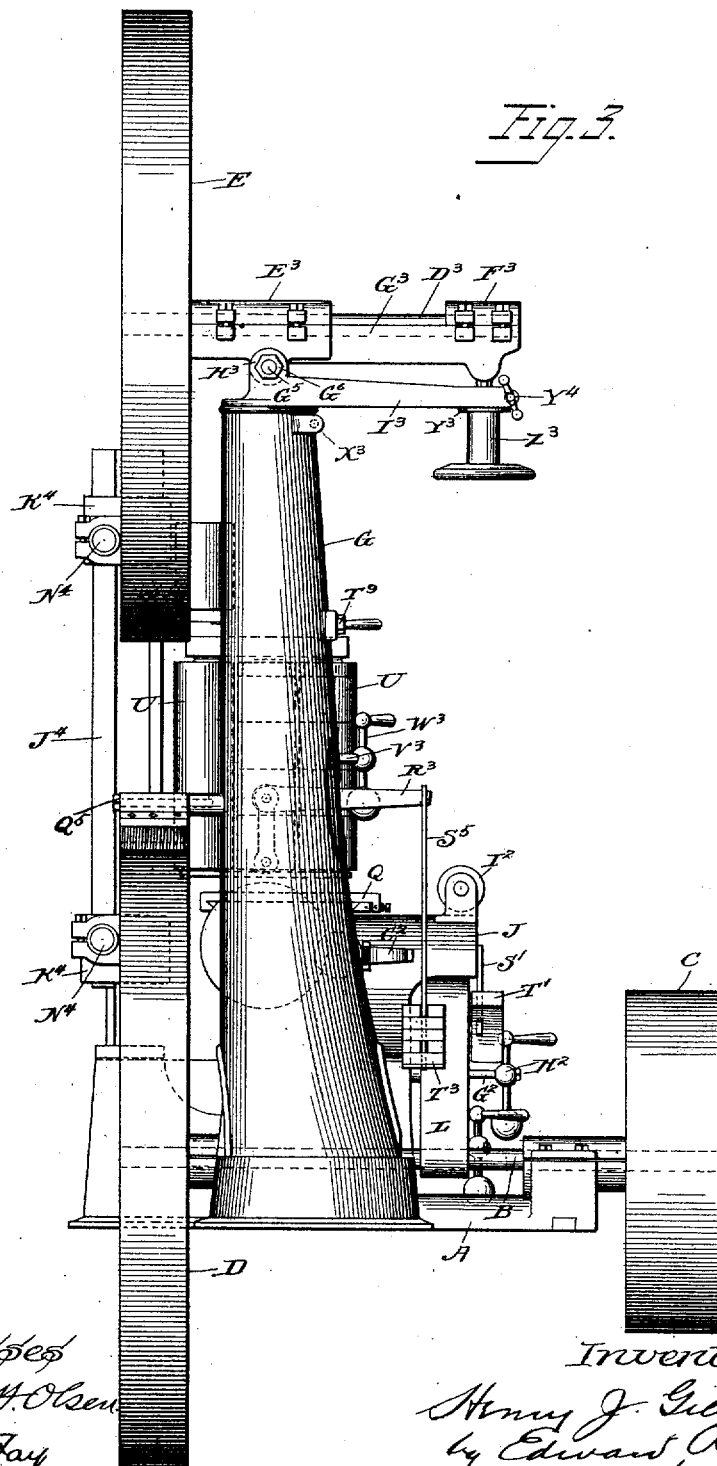

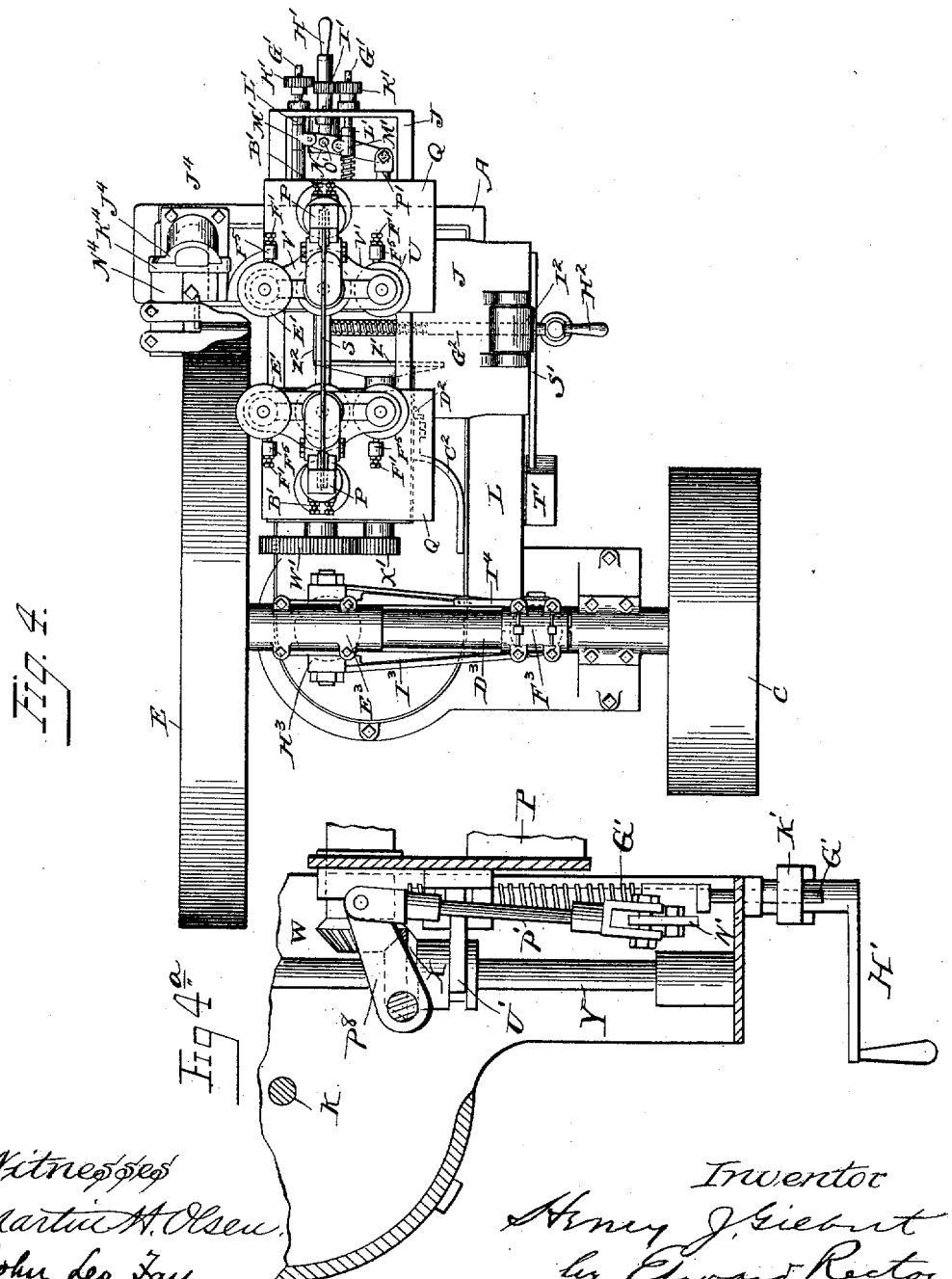

(No Model.) 10 Sheets—Sheet 6.
H. J. GILBERT.
RESAWING MACHINE.
No. 537,526. Patented Apr. 16, 1895.
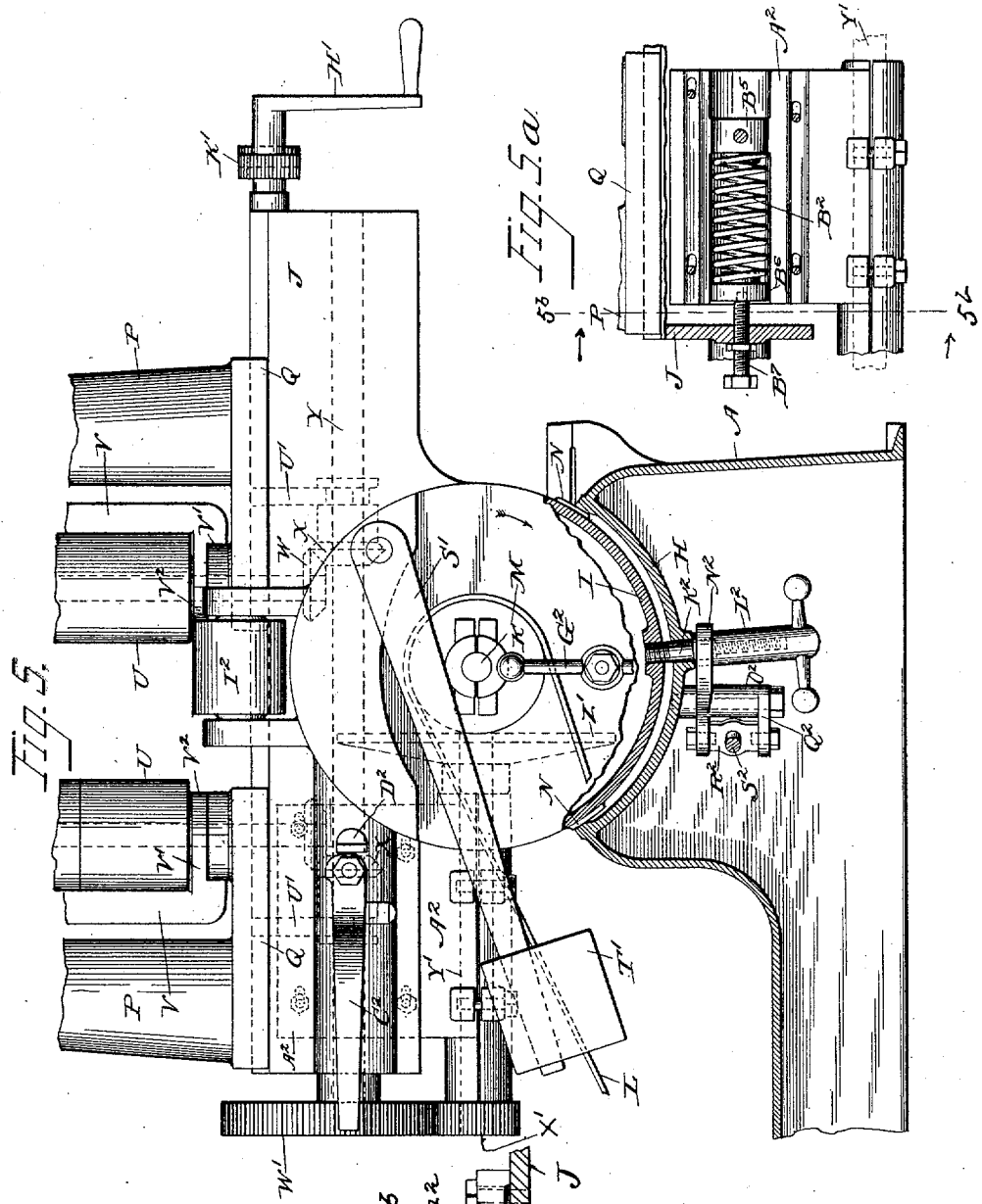
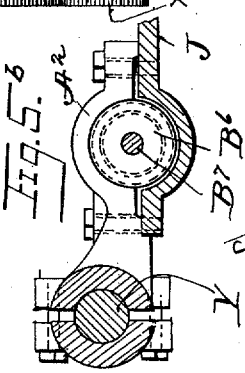
Witnesses
Martin H. Olsen.
John Leo Fay.
Inventor
Henry J. Gilbert
by Edward Rector
his atty.

(No Model.) 10 Sheets—Sheet 7.

H. J. GILBERT.
RESAWING MACHINE.

No. 537,526. Patented Apr. 16, 1895.

Witnesses
Martin H. Olsen.
John Leo Fay.

Inventor
Henry J. Gilbert
by Edward Rector
his atty

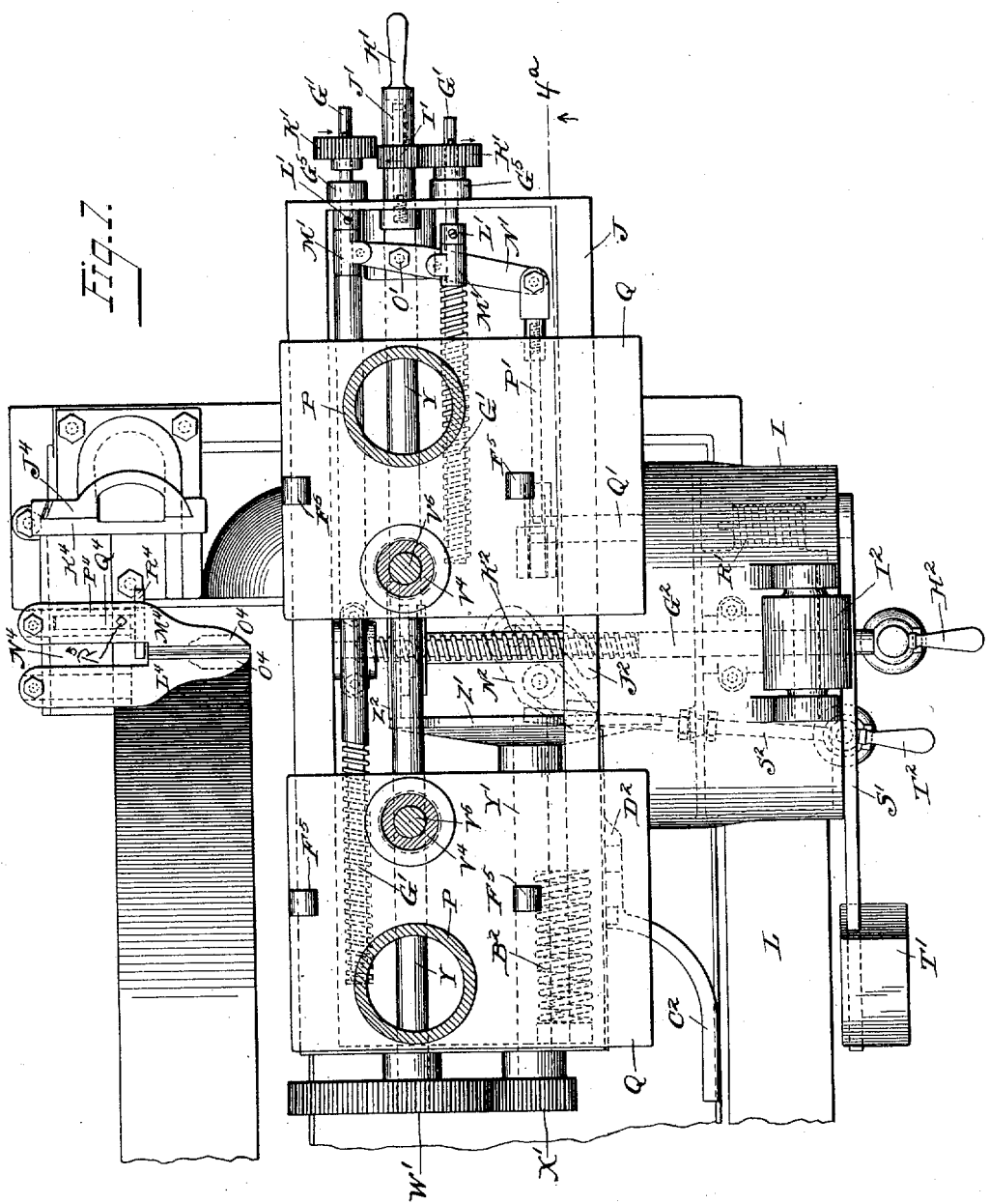

(No Model.)
10 Sheets—Sheet 9.
H. J. GILBERT.
RESAWING MACHINE.
No. 537,526.  Patented Apr. 16, 1895.
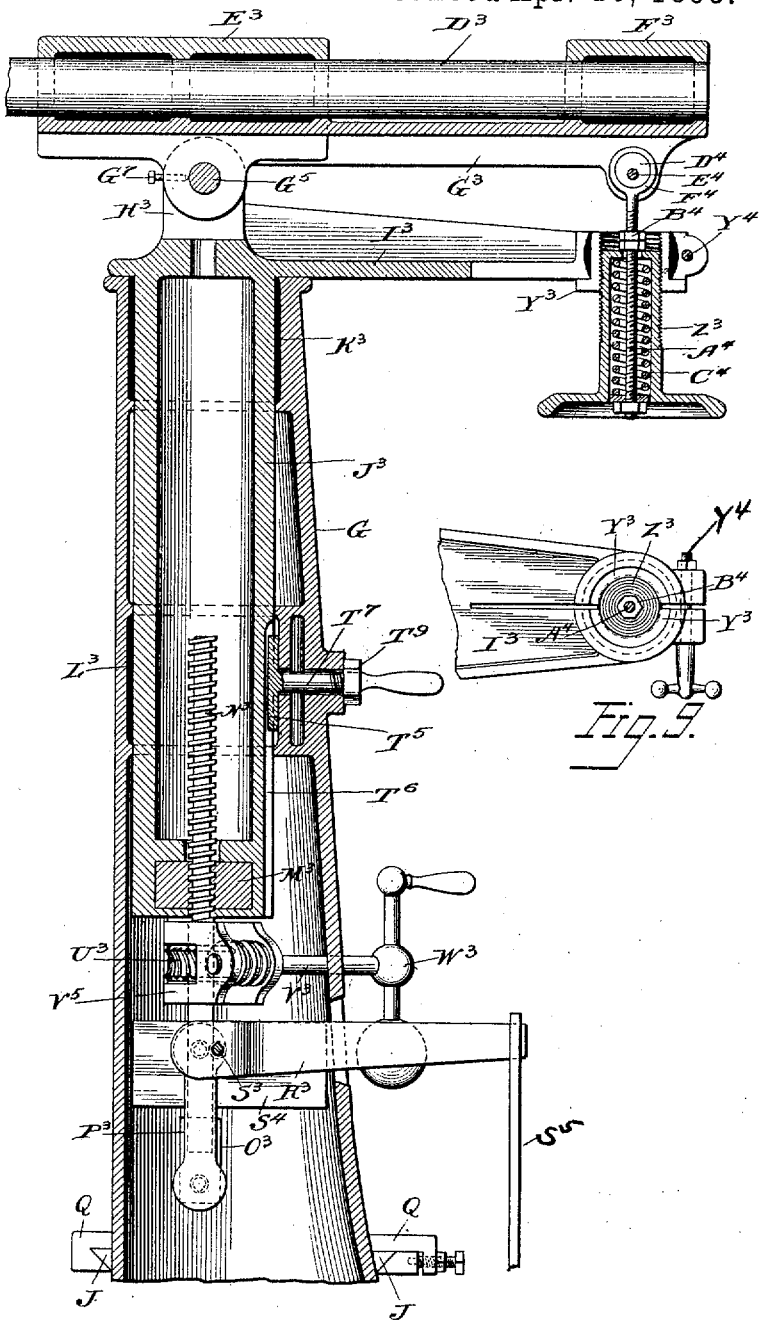
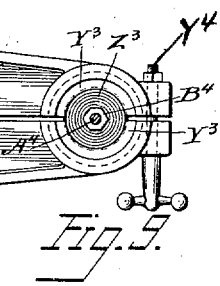
Witnesses
Martin H. Olsen
John Leo Fay
Inventor
Henry J. Gilbert
by Edward Rector
his atty
THE NORRIS PETERS CO., PHOTO-LITHO., WASHINGTON, D. C.

(No Model.) 10 Sheets—Sheet 10.
H. J. GILBERT.
RESAWING MACHINE.
No. 537,526. Patented Apr. 16, 1895.
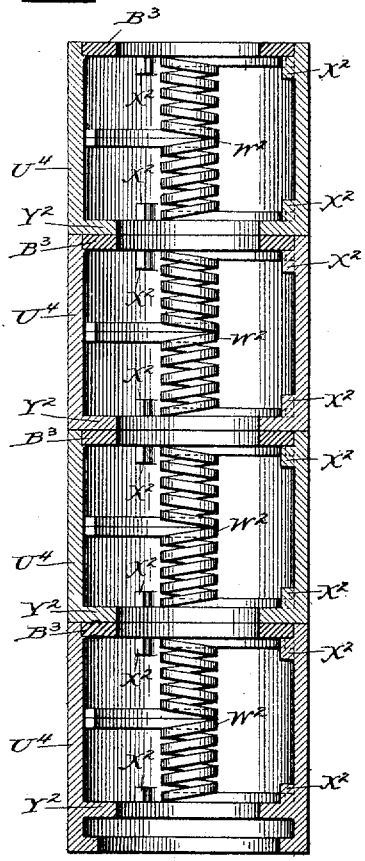
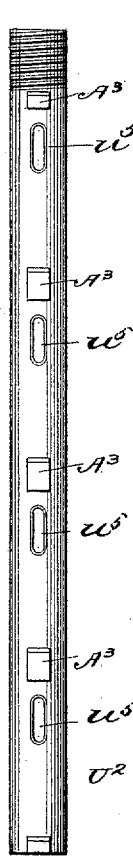
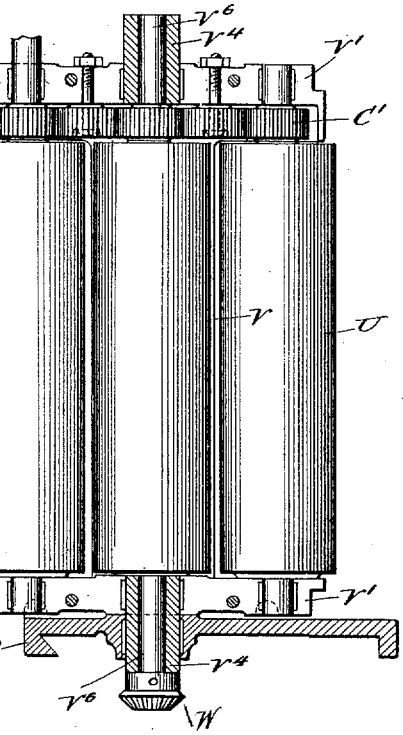
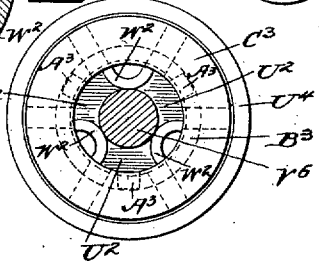
Witnesses
Martin H. Olsen.
John Leo Fay.
Inventor
Henry J Gilbert
by Edward Rector
his atty
THE NORRIS PETERS CO., PHOTO-LITHO., WASHINGTON, D. C.

UNITED STATES PATENT OFFICE.

HENRY J. GILBERT, OF SAGINAW, MICHIGAN.

RESAWING-MACHINE.

SPECIFICATION forming part of Letters Patent No. 537,526, dated April 16, 1895.

Application filed October 22, 1894. Serial No. 526,616. (No model.)

*To all whom it may concern:*

Be it known that I, HENRY J. GILBERT, a citizen of the United States, residing at Saginaw, in the county of Saginaw and State of Michigan, have invented a certain new and useful Improvement in Resawing-Machines, of which the following is a description, reference being had to the accompanying drawings, forming part of this specification.
The principal feature of my invention relates to re-sawing machines in which the feed rolls which advance the stock to the saw are mounted upon a tilting table or frame, by adjusting which upon its axis the rolls may be inclined to the vertical plane of the saw to cause the stock to be cut on an angle, as in the manufacture of weatherboarding or siding, or may be set in vertical position for the simple splitting or thin sawing of the stock.
It is desirable in all re-sawing machines that the rear pair of feed rolls be located as near the cutting edge of the saw as possible, in order that they may hold the stock in true position at the cutting point notwithstanding any warping or unevenness of the stock. To permit tilting of the rolls, however, to incline them to the vertical plane of the saw for the purpose above described, it is necessary that the rear rolls shall be sufficiently removed from the saw to clear it when the rolls are tilted. Heretofore the rolls have been mounted in fixed position relatively to the transverse plane of the saw, and in order to permit them to be tilted when desired the rear rolls have necessarily been located at some distance from the cutting edge of the saw, the result being that it has often been impossible to hold very thin stock in sufficiently true position at the cutting point to prevent the saw either entirely running out at one side of the stock or at least cutting boards of very uneven thickness. It is the object of this feature of my invention to produce a machine in which the rear rolls may be set very close to the cutting edge of the saw, so as to hold the stock in absolutely true position at the cutting point, and yet to provide for the ready tilting of the rolls whenever it is desired to cut stuff at an angle. To this end I have provided means for adjusting the rolls back and forth, toward and from the saw, in the plane thereof, so that when it is desired to split very thin stock or cut very thin boards the rolls may be moved rearward toward the saw until the front edge of the latter enters between the two rear rolls, almost to the transverse line of their axes, and when it is desired to cut stock at an angle, such as the siding before mentioned, which is always comparatively thick, the rolls may be moved forward far enough for the rear rolls to clear the saw when the rolls are tilted. Under the preferred construction which I employ the rolls are automatically tilted by the act of moving them forward, as soon as they have reached a position for the rear rolls to clear the saw, and when they are moved rearward again they are automatically reset to vertical position; but this is not essential to the broader scope of the invention, since independent means may be employed for moving the rolls forward and backward and for tilting them. The several other features of my invention are independent of this adjustment of the feed rolls and most of them may be employed in machines in which the rolls cannot be tilted but are permanently set for straight sawing, the principal one of said features consisting in a novel construction of some of the rolls themselves, all as will be hereinafter set forth and specifically pointed out in the claims.

The machine illustrated in the drawings and hereinafter described is a band-saw machine, but my invention in most of its features is applicable as well to machines employing circular saws, as will be understood from the description of it which will be given.

Figure 2A:
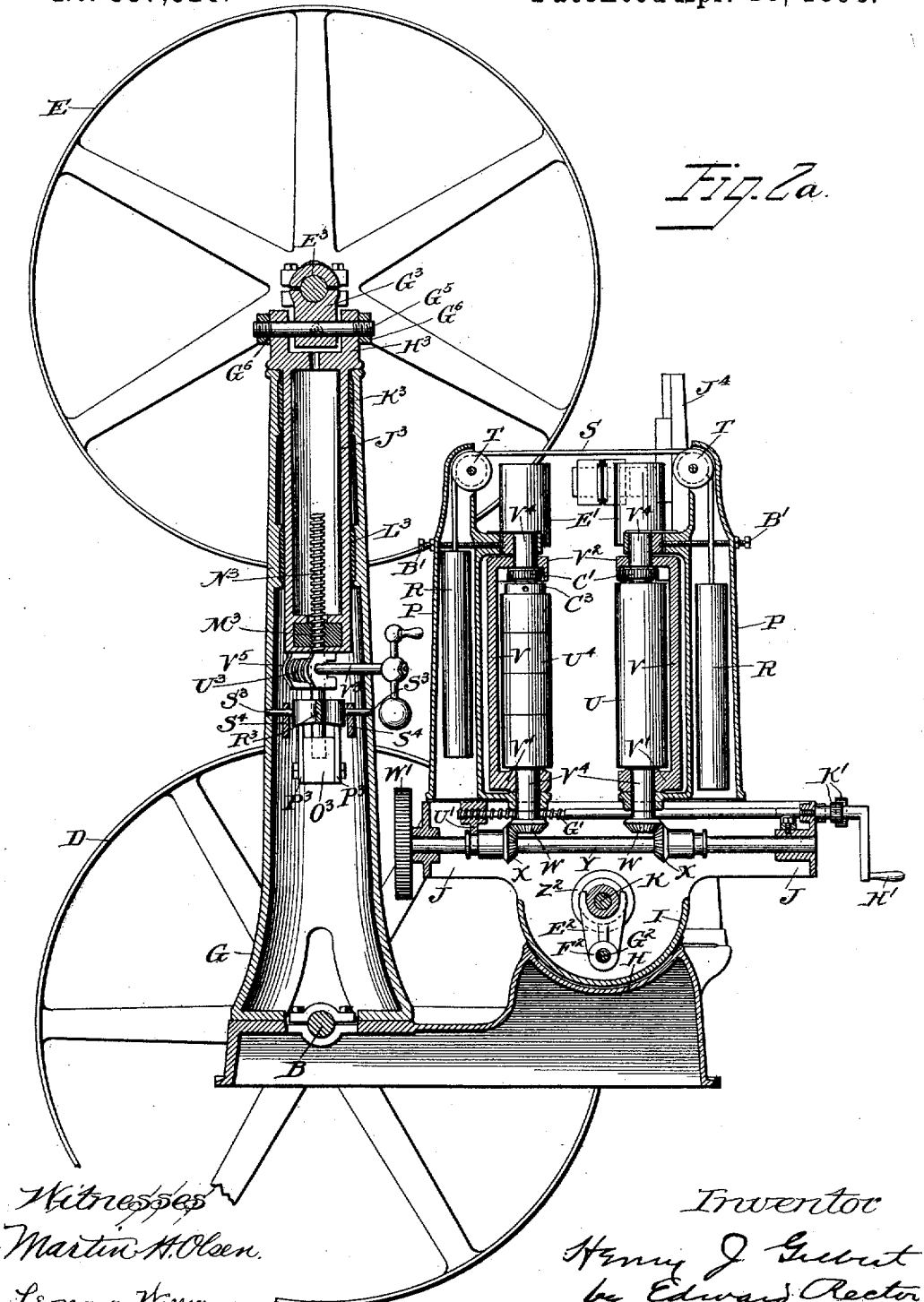

In the accompanying drawings, Figure 1 is a front elevation of the machine, with the supporting column for the upper saw wheel partly in section and with the pulley removed from the driving shaft; Fig. 2, an elevation of the right side of the machine; Fig. 2$^a$, a transverse vertical section of the machine approximately on the line 2$^a$—2$^a$ of Fig. 2; Fig. 3, an elevation of the left side thereof; Fig. 4, a top plan view; Fig. 4$^a$, a sectional detail approximately on the dotted line 4$^a$ of Fig. 7; Fig. 5, an enlarged detail view, partly in elevation and partly in section, of the lower part of the machine as shown in Fig. 1; Fig. 5$^a$, a broken detail from the part of the machine shown in Fig. 5; Fig 5$^b$, a sectional detail approximately on the line 5$^b$—5$^b$ of Fig.

Figure 6:
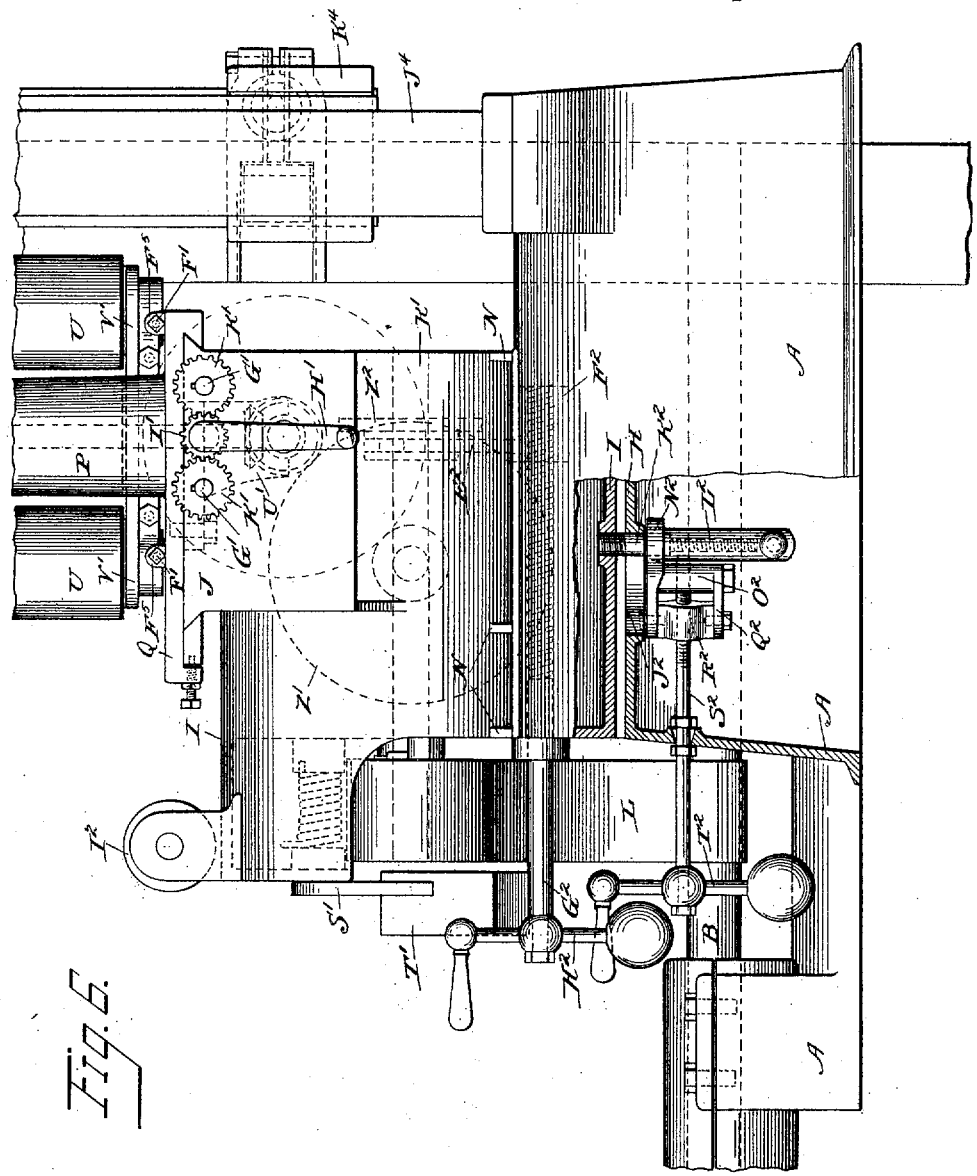

5ᵃ; Fig. 6, an enlarged detail view, partly in elevation and partly in section, of the lower part of the machine as shown in Fig. 2; Fig. 7, an enlarged detail top plan view with the feed rolls and their swiveled supporting frames removed and with the roll stands in section; Fig. 8, an enlarged vertical section of the upper half of the main supporting column and the parts carried by it; Fig. 9, a detail top plan view of the outer end of the horizontal arm of the vertically adjustable column which carries the upper saw wheel; Fig. 10, a vertical section of one of the broken rolls, with the spindle, the three-part sleeve fitting thereon and all but one of the three sets of springs removed; Fig. 11, an elevation of one part of the three-part sleeve; Fig. 12, a cross-section of one of the broken rolls; Fig. 13, a top plan view of one of the broken rolls, showing the nut for drawing up the three-part sleeve and converting the broken roll into a solid one; Fig. 14, an elevation of one set of rolls, with the caps which hold their spindles in their bearings removed to expose the bearings and the gears by which the rolls are driven by the middle one, and Fig. 15 a top plan view of one set of rolls, showing the support and bearing for the spindle of the middle roll in section.

The same letters of reference are used to indicate identical parts in all the figures.

The framework and mechanism of the machine are supported upon a hollow base casting A in whose lower left hand portion is journaled the driving shaft B which has fast upon its front end the pulley C around which the belt from the counter shaft passes and by which power is transmitted to the machine. This shaft B has fast upon its rear end the lower one D of the two saw wheels, the upper one E of which is fast upon a shaft $D^3$ journaled in bearings adjustably mounted as hereinafter described at the upper end of the hollow supporting column G which rests at its lower end upon and is secured to the base A.

The tilting frame upon which the feed rolls are mounted consists of a hollow cylindrical body portion I and a transverse rectangular open framework J formed integral with it across the upper side of its rear end. The lower side of the cylinder I rests in a curved seat H formed in the right hand end of the base casting A. The frame I J is free to be tilted in its seat H and to be slid backward and forward therein, and to lessen the friction between the parts the cylinder I has short curved fitting strips N formed upon its opposite sides, which strips rest upon longitudinal fitting strips formed upon the opposite upper edges of the seat H, these being the only points of contact between the frame and seat and forming the bearings upon which the frame is tilted and slid forward and backward.

Upon the horizontal top of the frame J are mounted the transversely adjustable roll-stands P P. These stands consist of hollow columns secured upon or formed integral with slides Q Q dovetailed upon the top of the frame J. Within the columns are weights R R suspended upon the opposite ends of a rope or chain passing over grooved pulleys T T mounted in the upper ends of the columns, this connection of the upper ends of the columns serving to brace them against strains but permitting them to be adjusted bodily toward and from each other.

The two sets of feed rolls U, each containing three rolls, are mounted in a pair of swiveled frames V V resting at their lower ends upon the slides Q Q and supported at their upper ends by the columns P P in the manner hereinafter described. Each frame consists of a narrow vertical plate V standing between the middle roll and the column P and slightly curved in cross sections to fit around the outer side of the middle roll, and integral horizontal plates V′ V′ at its upper and lower ends projecting laterally upon opposite sides of it, Figs. 4, 14 and 15. These horizontal end plates contain the halves of the bearings for the upper and lower ends of the roll spindles, the other halves of the bearings being formed in the caps $V^2$ which fit against and are bolted to the straight inner faces of the plates V′. The bearings for the spindles of the two end rolls consist of simple babbitted boxes, the rolls being cast upon the spindles and the fitting strips upon their lower ends resting upon the bottom plates V′. The middle one of the three bearings or openings in each plate V′ and its cap $V^2$ is larger than the end ones and has fitted in it a thimble or short sleeve $V^4$ Figs. 2ᵃ and 14 through which passes the roll spindle $V^6$ and upon which rests the lower end of the roll. When this thimble is placed in position and the cap $V^2$ applied and bolted tightly to the plate V′ the thimble will be clamped between them. The lower thimble $V^4$ passes through and has its bearing in the slide Q beneath the plate V′, while the roll spindle passes loosely through the thimble and has its bearing in it and carries at its lower end a beveled gear hereinafter referred to. The thimble at the upper end of the spindle is clamped between the upper plate V′ and its cap $V^2$ and projects above them and is confined and has its bearing within the outer end of a U-shaped strap plate A′ bolted at its ends to the sides of the column P. One half of the bearing for the thimble consists of the curved inner face of the outer end of the plate A′ itself, and the other of a wood block $V^7$ confined within the plate and adjustable toward the thimble, to take up wear, by means of a pair of adjusting screws B′ passed through the column P and having nuts upon their outer ends, Fig. 15. The upper thimble being free to turn in this bearing and the lower thimble in its bearing in the slide Q the roll frame is thus swiveled by the thimbles between the column P at its upper end and the slide Q at its lower end. It can be adjusted about its pivotal support and held in the required position by means of adjusting screws F' passed through lugs F$^5$ upon the slide Q and bearing against the outer side of the lower plate V' at its opposite ends, Figs. 6, 7 and 15. The end rolls in each set are driven from the middle roll by means of a train of gears C', one fast upon the spindle of each roll and the two intermediate ones mounted on short stub shafts secured to and depending from the plate V', Fig. 14. The plate V' and its cap V$^2$ have formed upon them a depending curtain or flange which hides the gears and protects them from dust. The spindle of the rear roll of each set extends above the plate V' and carries a short roll E', the rolls E' of the two sets operating upon the upper edge of any board of extra width which may be fed between the rolls. As before stated the spindle of the middle roll of each set extends down through the slide Q and has fast upon its lower end a beveled gear W meshing with a gear X splined upon a rotary shaft Y, Fig. 2$^a$ and dotted lines Figs. 1 and 5, journaled in the frame J and having fast upon its left hand end, beyond the frame, a gear W' which meshes with a smaller gear X' fast upon the outer end of a rotary shaft Y', Figs. 5 and 7, which has fast upon its inner end a large friction disk Z' against which bears a friction wheel Z$^2$, Fig. 2$^a$, splined upon a rotary shaft K extending longitudinally through the center of the cylinder I and journaled therein and driven from the shaft B by a belt L passing over a small pulley upon the shaft B and over a pulley M upon the front end of the shaft K, Fig. 1. In this manner the feed rolls are driven from the shaft B.

The shaft Y' which carries the friction disk Z' is not journaled in the frame J but in a supplemental frame A$^2$ mounted by slots and screws upon the inner face of the front wall of the frame J and depending below the same, Figs. 5, 5$^a$ and 5$^b$. A strong coiled spring B$^3$ confined in a cylindrical housing, formed half in the frame A$^2$ and half in the frame J, bears at its right hand end against the right hand end of the housing, formed by a disk B$^5$ cast in the frame A$^2$, Fig. 5$^a$, and at its other against a washer B$^6$ upon the end of an adjusting screw B$^7$ passing through a threaded opening in the end of the frame J, by which the tension of the spring may be regulated. This spring presses the frame A$^2$ and shaft Y' to the right and holds the disk Z' against the wheel Z$^2$ to form the driving connection. To enable the feed rolls to be quickly disconnected from the driving mechanism at any time the frame A$^2$ has projecting forward from it, through an opening in the frame J, a stud upon which is pivoted a lever C$^2$ which has a cam-shaped end adapted to co-operate with a fixed abutment D$^2$ upon the front side of the frame J, Figs. 1, 4 and 5. By throwing up the left hand end of this lever the frame A$^2$ will be forced to the left, against the tension of the spring B$^3$, and the disk Z' and wheel Z$^2$ separated, to break the driving connection.

For the purpose of regulating the speed of the feed rolls as desired the friction wheel Z$^2$ is splined upon the shaft K and means provided for sliding it toward and from the center of the disk Z', to consequently increase or decrease the speed of the shaft Y' and parts driven by it. As seen in Figs. 2$^a$ and 6 the wheel Z$^2$ has a circumferentially grooved hub in which fits the forked upper end of arm E$^2$ carried by a nut F$^2$ mounted upon a threaded shaft G$^2$ journaled in the front and rear ends of the cylinder I and provided upon its front end with a weighted handle H$^2$, Figs. 1 and 6. By turning this shaft in one direction or the other the wheel Z$^2$ may be slid back and forth along the shaft K for the purpose described.

A bearing roller I$^2$ is mounted between ears upon the upper side of the projecting front end of the cylinder I, upon which roller the stuff to be sawed rests as it is fed to the rolls U.

Each slide Q has bolted to its under side a depending plate U', Figs. 2$^a$ and 4$^a$ and dotted lines Figs. 5 and 6, whose lower end is forked or recessed to fit in a circumferential groove in the hub of the beveled pinion X, by which the latter is moved along the shaft Y with the slide and maintained in mesh with the beveled pinion W upon the lower end of the spindle of the middle roll.

The slides Q Q and sets of rolls carried by them are adjusted transversely of the machine upon the frame J by means of two screw shafts G' G' having opposite threads and passing through threaded openings in the plates U' upon the under sides of the slides, Fig. 7. These shafts may be independently turned by a handle H' applied to their right hand ends, to adjust the two sets of rolls independently, but for the purpose of moving them simultaneously toward or from each other the handle has fast upon it a pinion I' which when the handle is slipped over a fixed stub shaft J' projecting from the end of the frame J meshes with pinions K' K' upon the shafts G' G', so that by then turning the handle in one direction or the other the sets of rolls will be simultaneously adjusted toward or from each other.

The slides Q Q are capable of slight play toward and from each other, independently of any adjustment of them by the shafts G' G', to permit them to quickly yield to accommodate slight inequalities in the thickness of the stuff being sawed. To this end the shafts G' G' pass loosely through their bearings G$^5$ on the end of the frame J and their longitudinal movement is limited in one direction by the gears K' K' upon their outer ends and in the other by adjustable collars L' fastened by set screws upon the shafts inside the frame J, Fig. 7. Each of the shafts has a sleeve M' confined upon it between its collar L' at its right and a shoulder on the shaft at its left, which sleeves are pivoted to a lever N' upon opposite sides of its fixed fulcrum at O'. The front end of this lever is connected by an adjustable rod P' to an arm P⁸ projecting upwardly from a rock shaft Q' which extends forward through the front of the cylinder I, Figs. 4ª, 5, 6 and 7. Near its front end the shaft has coiled around it a strong spring R', Fig. 7, secured at one end in a collar fast upon the shaft and at its other to the front plate of the cylinder I, which spring presses the front end of the lever N' toward the left and yieldingly holds the parts in normal position, but permits the rolls to yield and quickly separate when necessary. To aid the tension of this spring the shaft Q' has fast upon its front end, outside the cylinder I, an arm S' which carries a weight T' at its outer end. By lifting this weight at any time the front end of the lever N' will be thrown to the right, so that the rolls may in this manner be quickly separated by hand when desired, as for instance to insert between them the end of a piece of stock too thick to be readily admitted otherwise.

When the collars L' are set in the position shown in Fig. 7 it will be seen that the two shafts G' G' and consequently the two slides Q Q and their respective sets of rolls will be so connected by the lever N' that one set of rolls cannot move in one direction without moving the other set an equal distance in the opposite direction, and thus if a board of uneven thickness be passed between the two sets of rolls, to be split, the rolls will yield equally in opposite directions and cause the board to be cut on a true middle line.

By changing the position of the collars L' upon the shafts G' either set of rolls may be rigidly held in fixed position, as is often desirable in machines of this character. Thus, by loosening the set screw of the collar upon the forward shaft and sliding the collar to the right against the end of the frame J and tightening up the set screw again the shaft will be rigidly held from longitudinal movement and the right hand set of rolls maintained in fixed position. Under such adjustment of the parts the sleeve M' upon said shaft will play idly back and forth between the collar and the shoulder on the shaft when the lever N' is vibrated by any slight longitudinal movement of the rear shaft. If it is desired to set the left hand set of rolls in fixed position the collar L' upon the rear shaft G' is loosened and the shaft and set of rolls slid to the left until the gear K' upon the outer end of the shaft abuts against the gearing G⁵ upon the end of the frame J, and the collar then fastened to the shaft again. This will prevent any longitudinal movement of the shaft and maintain the left hand set of rolls in fixed position, while the sleeve M' will play idly between the collar and shoulder on the shaft when the forward shaft is moved longitudinally by any lateral play of the right hand set of rolls.

It will be understood that when the collars L' are set in the manner above described, to hold the shafts G' from longitudinal movement, said shafts are nevertheless left free to turn, so that the two sets of rolls may be laterally adjusted to the desired position by turning said shafts, though held in fixed or unyielding position when so adjusted.

The means for moving the two sets of rolls forward and backward in the plane of the saw and inclining them at an angle thereto, for the purpose heretofore described, may be next explained. Generally stated, the devices provided for this purpose consist of a depending pin or projection upon the under side of the cylinder I of the feed roll frame, said pin extending downward through a cam slot in the concave seat H in which the frame rests, and means for sliding the frame forward and backward. The slot is of such shape that after the frame has been drawn forward far enough to clear the rear feed rolls from the saw the engagement of the pin with the curved or diagonal portion of the slot in the seat will cause the further forward movement of the frame to tilt it in its seat, and the degree of tilting will be greater or less according to the extent of the forward movement of the frame. A detailed description of this connection of the frame with its seat, and of the means for sliding the frame forward and backward, will now be given, reference being had more particularly to Figs. 5, 6 and 7. The shape of the cam slot J² in the seat H is clearly shown by the dotted lines in Fig. 7. The pin K² which passes through this slot has a threaded upper end by which it is firmly screwed into the bottom of the cylinder I. The portion of the pin which passes through and plays in the slot J² is smooth, while its reduced lower end is threaded to receive a clamping handle L² having a long tubular portion interiorly threaded to screw upon the pin K² and adapted to bear at its upper end against the under side of the seat H. Upon unscrewing this handle the pin is free to be moved in the slot and permit the frame I J to be adjusted in the manner described, and by screwing the handle up until its upper end bears tightly against the under side of the seat H the frame will be clamped to said seat in its newly adjusted position. Access is had to the handle L² through a door M² in the front of the casting A, Fig. 1.

Pivoted upon the under side of the seat H at the left of the slot J², Figs. 5, 6 and 7, is a lever N² having a slot or opening in its right hand end through which the pin K² and the upper end of the tubular clamp L² surrounding it loosely pass. This lever is formed integral with a sleeve O² by which it is mounted upon its pivot—a bolt screwed at its upper end into the seat H—and said sleeve has an integral arm Q² projecting to the left from its lower end, beneath the left hand end of the lever N². Between this arm and the lever is swiveled a block R² provided with a threaded opening through which passes the threaded rear end of a rod S² whose front end extends through an opening in the front wall of the base casting A and has fast upon it a weighted handle $T^2$. By turning this rod one way or the other the lever $N^2$ will be rocked on its pivot and its right hand end moved forward or backward to carry the frame I J in one direction or the other. The opening in the front of the casting A through which the rod $S^2$ passes does not fit the latter tightly but permits sufficient play of it to accommodate the movement of its rear end with the lever $N^2$, Fig. 6, and the rod has fast upon it nuts or collars $T^5$ upon opposite sides of the front wall of the base casting for preventing longitudinal movement of it.

The shape of the cam slot $J^2$ is such that its straight rear end will permit the frame I J to be moved forward without tilting it until the rear rolls U are clear of the saw, and then, as the pin $K^2$ engages the curved front end of the slot, the frame is tilted in the direction of the arrow, Fig. 5, and the rolls inclined to the plane of the saw. When the frame is slid rearward again the first movement of it will carry the pin $K^2$ out of the curved end of the slot into the straight portion thereof and return the rolls to vertical position.

The feed rolls have thus far been referred to as if all of them consisted simply of solid rolls (or hollow cylinders) fast upon their spindles, and, so far as concerns the features of my invention thus far described, they may be of that construction, but another feature of my invention consists in the novel construction of some of the rolls themselves. The two forward rolls in the left hand set are what are known as "broken" rolls, each roll being composed of a number of sections mounted upon a single spindle. Broken rolls are old in this art, and the novelty of my invention consists in means for converting the rolls at will into solid rolls, and in a novel method of mounting the sections of the roll upon the spindle, by which they are enabled to yield to severe pressure against them and thereby accommodate the surface of the roll to inequalities in the surface of the stuff passed between the two sets of rolls. This novel construction of the broken rolls is shown more particularly in Figs. 1, and 10 to 13. As there shown each broken roll consists of four cylindrical sections $U^4$ of about equal length. The spindle $V^6$ of the roll has secured upon it a three-part sleeve $U^2$, each part having a series of vertical slots $U^5$ through which pass screws $U^6$ entering the spindle, this connection permitting the sleeve to slide vertically upon the spindle. The adjacent edges of the three parts of the sleeve are hollowed out to form three concave seats or recesses extending the entire length of the roll, the sides of each seat being formed by the hollowed out edges of the sleeve portions and its bottom by the surface of the spindle. Confined within each of the sections $U^4$ of the roll is a series of coiled springs whose coils fit in the longitudinal seats above referred to and whose free ends press outward against the inner surface of the roll. The latter has upon its inner surface a series of lugs $X^2$, one for each spring and against which one end of the spring squarely abuts, the opposite end of the spring being left free and simply bearing against the smooth inner surface of the roll. In the present instance there are six of the springs confined within each section of the roll, arranged in three pairs, the two springs of each pair being located one immediately above the other with their coils abutting in the same seat.

With the spindle turning in the direction of the arrow, Fig. 12, it will be seen that the springs form the driving connection between the spindle and the roll, the coils of the springs being firmly confined in the concave seats in the three part sleeve by the engagement of their ends with the lugs $X^2$ upon the inner surface of the roll. This connection permits the roll sections to yield upon the spindle and be independently pressed toward it when pressure sufficient to overcome the tension of the springs is applied to them on any side, thus enabling the entire roll to readily accommodate itself to any unevenness in the surface of the stuff passed between the two sets of rolls.

For the purpose of enabling the broken roll to be converted at will into a solid roll each roll section is provided near its lower end with an inner annular flange $Y^2$ of such width as to snugly fit against lugs $A^3$ upon the three-part sleeve when said sleeve is slid longitudinally of the spindle to move the lugs into the horizontal plane of the flange. There are in this instance three of the lugs $A^3$ to co-operate with each flange $Y^2$. Fitting within the upper end of each roll section, and supported at one side by the lug $X^2$ and at other points by suitable lugs or shoulders upon the inner surface of the roll, is a ring $B^3$ corresponding to the flange $Y^2$ at its lower end, the loose ring being employed instead of an integral flange to permit its removal for the insertion of the springs. The three-part sleeve has five sets of the lugs $A^3$, the lowermost set arranged to co-operate with the flange $Y^2$ of the lowest roll section, the uppermost one with the ring $B^3$ in the upper end of the uppermost section, and each of the other sets adapted to co-operate with the flange $Y^2$ in the lower end of one section and the ring $B^3$ in the upper end of the section immediately below it. In the normal position of the parts the several sets of lugs stand below the flanges $Y^2$ and rings $B^3$, out of their path, Figs. 10 and 11, so that the roll sections are free to yield to lateral pressure, but by simply drawing the three-part sleeve upward until the lugs $A^3$ are brought within the flanges $Y^2$ and rings $B^3$ the roll sections become rigid relatively to the spindle and the broken roll is converted into a solid one. For the purpose of drawing the three parts of the sleeve $U^2$ upward simultaneously their upper ends are threaded and have screwed upon them a nut $C^3$ resting upon the upper end of the roll on the ring $B^3$ in the upper end of the uppermost section, Figs. 1 and 13. By turning this nut by means of a rod inserted in radial holes provided in it for the purpose the three parts of the sleeve may be simultaneously raised or lowered to convert the broken roll into a solid one or vice versa. This feature of my invention is of broader scope than the particular construction and arrangement of the parts shown and described, which latter may be considerably varied without departing from my invention. Thus, the sleeve $U^2$, instead of being composed of three parts, forming three longitudinal concave seats, may be composed of either a greater or less number of parts, with a greater or less number of seats;
or a single solid sleeve entirely surrounding the spindle and vertically adjustable thereon may be employed.

As before stated, I am aware that broken rolls are old in this art, and also broken rolls convertible at will into solid rolls, but the means for converting them into solid rolls differ widely from the means employed by me for that purpose; and, too, such rolls with which I am familiar are idle or dead rolls instead of driven or live rolls. So far as I am aware I am the first in the art to combine a broken live roll of any sort with means of any sort for converting it at will into a solid roll; also the first to construct a roll, either broken or solid, of a spindle, a cylindrical shell, and interposed springs forming the driving connection between the spindle and shell, whereby the latter may yield relatively to the spindle to pressure on any side of it.

As heretofore stated, the lower saw wheel D is secured upon the driving shaft B. The upper wheel E is fast upon the end of a shaft $D^3$ journaled in boxes $E^3$ $F^3$ upon a frame $G^3$ pivoted near its end adjacent the wheel E between ears $H^3$ upon the upper side of a horizontal arm $I^3$ beneath the frame $G^3$ and shaft $D^3$. The pivot of the frame $G^3$ consists of a short rock shaft $G^5$ having its bearings in the ears $H^3$ and held in position by nuts $G^6$ upon its opposite ends, Fig. 1. The frame $G^3$ is fastened to this shaft by a set-screw $G^7$, Fig. 8. By loosening the nut upon one end of the shaft $G^5$ and tightening up the one on its opposite end the wheel may be adjusted in line with its axis to bring it exactly over the lower wheel.

The arm $I^3$ at its end beneath the pivot of the frame $G^3$ is rigidly secured to or formed integral with the upper end of a tubular supporting column $J^3$ fitting within the upper end of the main supporting column G heretofore referred to, Figs. 1, $2^a$ and 8. The column $J^3$ is vertically adjustable within the column G and is supported and guided therein by the following means: It extends downward about one half the length of the column G and at $K^3$ and $L^3$ is surrounded and guided by bands of Babbitt metal held in annular seats in the column G. Formed in its lower end is a recess in which is cast a Babbitt metal nut $M^3$ through which passes the threaded upper end of a vertical shaft $N^3$ whose lower end is seated in a block $O^3$ hung between the lower ends of strap plates $P^3$ which in turn are hung at their upper ends upon the opposite forks of a lever $R^3$. This lever is fulcrumed upon the inner ends of pins $S^3$ extending inward from the opposite sides of the column G through fixed plates $S^4$ secured or cast within the column, Figs. 1, $2^a$ and 8. It extends forward through a vertical slot in the column and has hung to it by a link $S^5$ a weight $T^3$, Fig. 3. This weight and leverage are such as to counterbalance the weight of the column $J^3$ and parts carried by it, the latter being thus supported through the medium of the nut $M^3$, shaft $N^3$, straps $P^3$ and block $O^3$ upon the inner end of the lever. The trunnions of the block $O^3$ which pass through the holes in the lower ends of the straps are beveled to an edge upon their under sides, Fig. 8, as are the upper sides of the trunnions upon the forks of the lever $R^3$, which pass through the holes in the upper ends of the straps, and the upper sides of the fulcrum pins $S^3$ of the lever $R^3$. The column $J^3$ and parts carried by it are thus delicately balanced upon the inner end of the lever so that the upper saw wheel can readily yield to any obstruction passing between the saw and wheels.

For the purpose of vertically adjusting the column $J^3$ and upper saw wheel the shaft $N^3$ has fast upon it just beneath the nut $M^3$ a worm-wheel $U^3$, Fig. 8, which is engaged by a worm upon a shaft $V^3$ mounted in a block $V^5$ loose upon the shaft $N^3$ and embracing the worm wheel $U^3$. This shaft $V^3$ extends outward through an opening in the column G and is provided with a weighted handle $W^3$. By turning this handle in one direction or the other the shaft $N^3$ will be turned in the nut $M^3$ to raise or lower the column $J^3$ and adjust the upper saw wheel as desired.

The upper end of the column G is split at its front and provided on opposite sides of the slit with ears $X^3$ through which passes a clamping bolt by which the upper end of the column may be drawn together around the column $J^3$ to take up any wear that may occur and properly hold and guide the column $J^3$.

The column $J^3$ is guided in its vertical movements and prevented from turning in the column G by means of a key $T^5$ which fits in a longitudinal groove or seat $T^6$ in the front side of the column $J^3$, Fig. 8. This key is confined between the column $J^3$ and the curved front wall of the circular babbitt box or seat $L^3$ in which the lower end of the column is guided, so that it cannot become displaced from its seat in the column. To the key is secured the inner end of a rod $T^7$ which extends forward through a horizontal slot $T^8$ in the front of the column G and has a handle upon its outer end. By moving this handle laterally in one direction or the other the column $J^3$ may be turned to adjust the angle of the upper saw wheel as desired, to give more or less lead to the saw, and by then tightening up a nut $T^9$ upon the rod $T^7$ against the front of the column G the key may be clamped against the inner surface of the front wall of the babbitt box, to hold the column $J^3$ and upper saw wheel in such adjusted position, while still permitting the column to move freely up and down in the column G.

For the purpose of tilting the frame $G^3$ and shaft $D^3$ upon their pivotal support between the ears $H^3$, to adjust the angle of the saw wheel E to properly hold the saw upon it under varying conditions of work, the following devices are employed, Figs. 8 and 9: Fitting within an opening in the outer end of the arm $I^3$ is an interiorly threaded split bushing $Y^3$ having a flange abutting against the under side of the arm $I^3$. The outer end of the arm $I^3$ is split longitudinally from its extreme end to a point some distance beyond the opening through which the bushing $Y^3$ passes, so that by drawing the two halves of the end of the arm together by means of the bolt $Y^4$ the bushing may be firmly clamped in position. Screwed into this bushing from below is the upper exteriorly threaded end of a tubular plug $Z^3$ having a milled hand piece upon its lower end by which it may be turned. The upper end of this tubular plug is closed, except a small central hole through which passes a rod $A^4$ pivoted to and depending from the under side of the pivoted frame $G^3$. Jam nuts $B^4$ secured upon the rod rest upon the upper end of the plug $Z^3$ and thus support the outer end of the frame $G^3$ upon the frame $I^3$. A spring $C^4$ is coiled around the rod $A^4$ within the plug $Z^3$ and confined thereon by a nut and washer at its lower end. The tension of this spring holds the nuts $B^4$ against the upper end of the plug and yieldingly maintains the frame $G^3$ and shaft $D^3$ and saw wheel E in normal position, but permits the frame $G^3$ to tilt and the saw wheel to yield when any obstruction passes between the saw and wheels. By loosening the clamping bolt $Y^4$ and screwing the plug $Z^3$ up or down in the bushing $Y^3$ the support for the outer end of the frame $G^3$ may be positively raised or lowered, to adjust the angle of the saw wheel as may be necessary to properly hold the saw upon it, and by then tightening up the bolt $Y^4$ the plug $Z^3$ will be firmly clamped in position by the split bushing $Y^3$, to maintain such adjustment.

For the purpose of providing means for quickly tilting the frame $G^3$ and saw wheel by hand, in any emergency requiring it, the upper end of the rod $A^4$, instead of being simply pivoted to the under side of the frame $G^3$, has formed upon it a strap which surrounds an eccentric $D^4$ fast upon a rock-shaft or pivot pin $E^4$ mounted in ears $F^4$ upon the under side of the frame $G^3$. This shaft has a lever $G^4$, Fig. 2, secured to it, by which it may be turned to cause the eccentric to raise the outer end of the frame $G^3$ and tilt the saw wheel. This arrangement may serve as a means for temporarily adjusting the angle of the saw wheel, as well as for simply tilting it in an emergency, to which end the lever $G^4$ has fast upon it a notched or fluted disk $H^4$ with which co-operates a spring arm $I^4$ secured to the side of the frame $G^3$ to hold the shaft in its different adjusted positions.

The two sets of saw-guiding devices are carried by vertically adjustable slides $K^4$ dovetailed upon a standard $J^4$, Fig. 7. The two jaws $L^4$ $M^4$ of each guide are clamped at their rear ends upon a cylindrical support $N^4$ projecting from the slide $K^4$, and have upon the inner faces of their front ends dovetailed seats for the friction blocks $O^4$. One of the jaws has a bore extending through it from front to rear and opening at its front end through an offset or shoulder on the outer side of the jaw, about midway of its length, and registering with a bore extending through the tubular support $N^4$. In this bore fits a steel pocket bearing $P^4$ adapted to receive a shaft $Q^4$ which has fast upon its outer end a steel friction wheel $R^4$ whose edge projects laterally through an opening in the jaw and stands immediately behind the rear edge of the saw. The bearing $P^4$ may be adjusted backward and forward and held in adjusted position by a set screw $R^5$ passed through the jaw and bearing against its upper side.

The usual brush or scraper $Q^5$ for the lower saw wheel is supported by the column G, Fig. 3.

Having thus fully described my invention, I claim—

1. In a resawing machine, the combination, with the saw and the set of feed rolls, adjustable in relation to each other, of means for adjusting one toward and from the other in the cutting plane of the saw and for inclining the rolls at an angle thereto, substantially as and for the purpose described.

2. In a resawing machine, the combination with the saw, mounted in a substantially fixed position, of the set of feed rolls adjustable toward and from the same in the cutting plane thereof, and means for moving the rolls toward and from the saw and inclining them to the plane thereof, substantially as described.

3. In a resawing machine, the combination, with the saw, of the set of feed rolls mounted to move toward and from the same and to tilt at an angle to the plane thereof, and means for moving the rolls toward and from the saw and automatically tilting them as they are moved from it, substantially as described.

4. In a resawing machine, the combination, with the saw, of the set of feed rolls mounted to move toward and from the same and to tilt at an angle to the plane thereof, and means for moving the rolls toward and from the saw and automatically tilting them at an angle thereto as they are moved from it and restoring them to vertical position as they are returned toward it, substantially as described.

5. In a resawing machine, the combination, with the saw, of a feed-roll supporting frame mounted to move toward and from the saw in the cutting plane thereof and to tilt at an angle thereto, a set of feed rolls laterally adjustable on said frame, and means for moving the frame toward and from the saw and tilting it to incline the rolls to the plane thereof, substantially as described.

6. In a resawing machine, the combination, with the saw, of a feed roll supporting frame mounted to slide toward and from the saw in the cutting plane thereof and to tilt at an angle thereto, a pair of slides mounted upon said frame and independently adjustable transversely thereof, a set of rolls carried by said slides, and means for moving the frame toward and from the saw and tilting it to incline the rolls to the plane thereof, substantially as described.

7. In a resawing machine, the combination, with the saw, of a feed roll supporting frame mounted to slide toward and from the saw in the plane thereof and to tilt at an angle thereto, a pair of slides mounted upon said frame and independently adjustable transversely thereof, a set of rolls carried by said slides, and means for moving the frame toward and from the saw and automatically tilting it as it is moved from the saw to incline the rolls to the plane thereof, substantially as described.

8. In a resawing machine, the combination, with the saw, of a feed roll supporting frame mounted to slide toward and from the saw in the plane thereof and to tilt at an angle thereto, a pair of slides mounted upon said frame and independently adjustable transversely thereof, a set of rolls carried by said slides, and means for moving the frame toward and from the saw and automatically tilting it as it is moved from the saw, to incline the rolls to the plane thereof, and restoring it to normal position as it is moved toward the saw, to return the rolls to the vertical plane thereof, substantially as described.

9. In a resawing machine, the combination, with the saw, of a feed roll supporting frame mounted to move toward and from the saw and to tilt at an angle to the plane thereof, a set of feed rolls laterally adjustable upon said frame, means for moving the frame toward and from the saw, and a cam co-operating with the frame to tilt it as it is moved away from the saw, substantially as described.

10. In a resawing machine, the combination, with the saw, of a feed roll supporting frame mounted to move toward and from the saw and to tilt at an angle to the plane thereof, a set of feed rolls laterally adjustable upon said frame, means for moving the frame toward and from the saw, and a cam co-operating with the frame to tilt it from normal position as it is moved away from the saw and to tilt it back to such position as it is moved toward the saw, substantially as described.

11. In a resawing machine, the combination, with the saw, of a feed roll supporting frame mounted to move toward and from the saw and to tilt at an angle to the plane thereof, a set of feed rolls laterally adjustable upon said frame, means for moving the frame toward and from the saw, and a pin co-operating with a cam slot, one fixed and the other moving with the frame, to tilt the frame from normal position as it is moved away from the saw and to tilt it back to such position as it is moved toward the saw, substantially as described.

12. In a resawing machine, the combination, with the saw, of a feed roll supporting frame mounted to move toward and from the saw and to tilt at an angle to the plane thereof, a set of feed rolls laterally adjustable upon said frame, means for moving the frame toward and from the saw, and a projection on the frame traveling in a cam slot in a fixed part of the framework, to tilt the frame from normal position as it is moved away from the saw, and to tilt it back to such position as it is moved toward the saw, substantially as described.

13. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a pair of slides transversely adjustable upon said horizontal portion of the frame, a set of feed rolls carried by the slides, and means for adjusting said slides upon the frame and for moving the latter back and forth in its seat and tilting it, substantially as described.

14. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a set of feed rolls laterally adjustable upon said horizontal portion, a pin or projection upon the cylindrical portion passing through a cam slot in a concave seat in the base, and means for moving the frame forward and backward in its seat, substantially as and for the purpose described.

15. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a set of feed rolls laterally adjustable upon said horizontal portion, a pin or projection upon the horizontal portion passing through a cam slot in the concave seat in the base, means for moving the frame forward and backward in its seat, and means for clamping the frame to the seat in its different adjusted positions, substantially as and for the purpose described.

16. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a set of feed rolls laterally adjustable upon said horizontal portion, a pin projecting from the cylindrical portion through a cam slot in the concave seat in the base, means for moving the frame forward and backward in its seat, and a clamp screwed upon the lower end of the pin beneath the seat and bearing against the under side of the latter, for clamping the frame to the seat, substantially as described.

17. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a pair of slides transversely adjustable upon said horizontal portion of the frame, feed rolls carried by said slides, a driving shaft extending longitudinally through the center of the cylindrical portion and geared to the rolls, and means for adjusting the roll slides transversely of the frame and tilting the latter in its seat, substantially as described.

18. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a pair of slides transversely adjustable upon said horizontal portion of the frame, feed rolls carried by said slides, a driving shaft extending longitudinally through the center of the cylindrical portion of the frame, a friction wheel mounted upon and turning with said shaft and adjustable longitudinally of it, a rotary shaft geared to the feed rolls, a friction disk carried thereby and co-operating with said friction wheel, means for adjusting the latter along its shaft toward and from the center of the friction disk, and means for adjusting the roll slides transversely of their supporting frame and tilting the latter in its seat, substantially as described.

19. In a resawing machine, the combination of a base casting or framework having a concave seat, a feed roll supporting frame composed of a substantially cylindrical portion resting in said seat, and adapted to slide back and forth and tilt therein, and a transverse horizontal portion carried by the cylindrical portion, a pair of slides transversely adjustable upon said horizontal portion of the frame, feed rolls carried by said slides, a driving shaft extending longitudinally through the center of the cylindrical portion of the frame, a friction wheel mounted upon and turning with said shaft and adjustable longitudinally of it, a rotary shaft geared to the feed rolls, a friction disk carried thereby and co-operating with said friction wheel, means for adjusting the latter along its shaft toward and from the center of the friction disk, a spring pressing said disk against the wheel, means for moving the disk away from the wheel, against the resistance of the spring, to break the driving connection with the feed rolls, and means for adjusting the roll slides transversely of the supporting frame and tilting the latter in its seat, substantially as described.

20. In a resawing machine, the combination of a base casting or framework having a concave seat, a feed roll supporting frame composed of a substantially cylindrical portion resting in said seat and a transverse horizontal portion, a set of feed rolls laterally adjustable upon said horizontal portion, a driving shaft extending longitudinally through the center of the cylindrical portion of the frame, a friction wheel mounted upon said shaft, a rotary shaft geared to the feed rolls and mounted in a supplemental laterally movable frame, a friction disk carried by said shaft and co-operating with the friction wheel, a spring bearing against said supplemental frame and operating to press the friction disk against the friction wheel, a cam and lever for moving the supplemental frame against the resistance of its spring, to separate the disk and wheel and break the driving connection with the feed rolls, and means for tilting the roll-supporting frame in its seat to incline the rolls to the plane of the saw, substantially as described.

21. In a resawing machine, the combination of the base casting A having the concave seat H, the tilting and forwardly and backwardly adjustable feed roll frame composed of the cylindrical portion I resting in the seat H and the transverse horizontal portion J, the set of transversely adjustable feed rolls mounted upon the portion J, and means for sliding the frame I J back and forth in the seat H and tilting it, substantially as described.

22. In a resawing machine, the combination of the base casting A having the concave seat H, the tilting and forwardly and backwardly adjustable feed roll frame composed of the cylindrical portion I resting in the seat H and the transverse horizontal portion J, the set of transversely adjustable feed rolls mounted upon the portion J, the pin K² projecting from the under side of the cylinder I through the cam slot J² in the seat H, and means for sliding the frame I J back and forth in the seat H, substantially as and for the purpose described.

23. In a resawing machine, the combination of the base casting A having the concave seat H, the tilting and forwardly and backwardly adjustable feed roll frame composed of the cylindrical portion I resting in the seat H and the transverse horizontal portion J, the set of transversely adjustable feed rolls mounted upon the portion J, the pin $K^2$ projecting from the under side of the cylinder I through the cam slot $J^2$ in the seat H, means for sliding the frame I J back and forth in the seat H, and the tubular clamp $L^2$ screwed upon the lower end of the pin $K^2$ and bearing against the under side of the seat H, substantially as and for the purpose described.

24. In a resawing machine, the combination of the base casting A having the concave seat H, the tilting and forwardly and backwardly adjustable feed roll frame composed of the cylindrical portion I resting in the seat H and the transverse horizontal portion J, the set of transversely adjustable feed rolls mounted upon the portion J, the pin $K^2$ projecting from the under side of the cylinder I through the cam slot $J^2$ in the seat H, means for sliding the frame I J back and forth in the seat H, the tubular clamp $L^2$ screwed upon the lower end of the pin $K^2$ and bearing against the under side of the seat H, the lever $N^2$ pivoted to the under side of the seat H and having an opening at one end embracing the clamp $L^2$, and the screw rod $S^2$ co-operating with its opposite end, substantially as and for the purpose described.

25. In a resawing machine, the combination of the base casting A having the concave seat H, the tilting and forwardly and backwardly movable feed roll frame composed of the cylindrical portion I resting in the seat H and the transverse horizontal portion J, the set of transversely adjustable feed rolls mounted upon the portion J, the pin $K^2$ projecting from the under side of the cylinder I through the cam slot $J^2$ in the seat H, means for sliding the frame I J back and forth in the seat H, the tubular clamp $L^2$ screwed upon the lower end of the pin $K^2$ and bearing against the under side of the seat H, the lever $N^2$ pivoted to the under side of said seat and having an opening at one end embracing the clamp $L^2$, the block $R^2$ swiveled between its opposite end and an arm $Q^2$ projecting from its hub, and the rod $S^2$ passing through and confined in the front wall of the base casting A and having its rear end threaded through the block $R^2$, substantially as and for the purpose described.

26. In a resawing machine, the combination of the base casting A having the concave seat H, the tilting feed roll frame composed of the cylindrical portion I resting in the seat H and the transverse horizontal portion J, the set of transversely adjustable feed rolls mounted upon the portion J, the driving shaft K extending longitudinally through the cylinder J, the transverse rotary shaft Y journaled in the frame J and geared to the feed rolls, the laterally movable supplemental frame $A^2$ mounted upon the frame J, the shaft $Y'$ journaled in the frame $A^2$ and geared to the shaft Y, the friction disk $Z'$ carried by the shaft $Y'$ and the co-operating friction wheel $Z^2$ carried by the shaft K, and the spring $B^2$ acting upon the frame $A^2$ to maintain the disk and wheel in contact, substantially as described.

27. In a resawing machine, the combination of the base casting A having the concave seat H, the tilting feed roll frame composed of the cylindrical portion I resting in the seat H and the transverse horizontal portion J, the set of transversely adjustable feed rolls mounted upon the portion J, the driving shaft K extending longitudinally through the cylinder I, the transverse rotary shaft Y journaled in the frame J and geared to the feed rolls, the laterally movable supplemental frame $A^2$ mounted upon the frame J, the shaft $Y'$ journaled in the frame $A^2$ and geared to the shaft Y, the friction disk $Z'$ carried by the shaft $Y'$ and the co-operating friction wheel $Z^2$ carried by the shaft K, the spring $B^2$ acting upon the frame $A^2$ to maintain the disk and wheel in contact, and the cam lever $C^2$ co-operating with the abutment $D^2$ for separating the disk $Z'$ and wheel $Z^2$ against the resistance of the spring $B^2$, substantially as described.

28. In a resawing machine, the combination of the base casting A having the concave seat H, the tilting feed roll frame composed of the cylindrical portion I resting in the seat H and the transverse horizontal portion J, the driving shaft K extending longitudinally through the center of the cylinder I, the friction wheel $Z^2$ splined upon said shaft, the transverse rotary shaft Y journaled in the frame J and geared to the feed rolls, the laterally movable supplemental frame $A^2$ mounted upon the frame J, the shaft $Y'$ journaled in the frame $A^2$ and geared to the shaft Y, the friction disk $Z'$ carried by the shaft $Y'$ and co-operating with the friction wheel $Z^2$ upon the shaft K, the spring $B^2$ acting upon the frame $A^2$ to maintain the disk and wheel in contact, and means for adjusting the wheel $Z^2$ along the shaft K toward and from the center of the disk $Z'$, substantially as described.

29. In a resawing machine, the combination of the base casting A having the concave seat H, the tilting feed roll frame composed of the cylindrical portion I resting in the seat H and the transverse horizontal portion J, the set of transversely adjustable feed rolls mounted upon the portion J, the driving shaft K extending longitudinally through the cylinder I, the friction wheel $Z^2$ splined upon said shaft, the transverse rotary shaft Y journaled in the frame J and geared to the feed rolls, the laterally movable supplemental frame $A^2$ mounted upon the frame J, the shaft $Y'$ journaled in the frame $A^2$ and geared to the shaft Y, the friction disk $Z'$ carried by the shaft $Y'$ and co-operating with the friction wheel $Z^2$ upon the shaft K, the spring $B^2$ acting upon the frame $A^2$ to maintain the disk and wheel in contact, the screw shaft $G^2$ extending longitudinally of the cylinder I beneath the shaft K and projecting through the front of the cylinder, and the nut $F^2$ upon the rear end of said shaft having the upwardly extending forked arm $E^2$ engaging a circumferential groove in the hub of the wheel $Z^2$, substantially as described.

30. In a resawing machine, the combination of the base casting A having the concave seat H, the tilting feed roll frame composed of the cylindrical portion I resting in the seat H and the transverse horizontal portion J, the driving shaft K extending longitudinally through the cylinder I, the transverse rotary shaft Y journaled in the frame J and geared to the feed rolls, the supplemental frame $A^2$ mounted to move laterally upon the frame J, the coiled spring $B^2$ fitting within the cylindrical housing, formed half in the frame $A^2$ and half in the frame J, and bearing at one end against the frame $A^2$ to press it in one direction, the washer $B^6$ at its other end, and the adjusting screw $B^7$ passing through the frame J and engaging the washer, for regulating the tension of the spring, the shaft Y' journaled in the frame $A^2$ and geared to the shaft Y, the friction disk Z' carried by the shaft Y' and the co-operating friction wheel $Z^2$ carried by the shaft K, substantially as described.

31. In a resawing machine, the combination of the frame J, the feed roll slides Q Q mounted thereon, the screw shafts G' G' co-operating with the respective slides, the sleeves M' M' loose upon the respective shafts, the spring-pressed or weighted lever N' pivoted to the sleeves M' upon opposite sides of its fulcrum, the adjustable collars L' L' upon the shafts at one end of the sleeves, operating to limit the movement of the shafts in one direction, and means, as the gears K', for limiting their movement in the opposite direction, whereby by properly adjusting the collars upon their shafts the two shafts and their respective roll slides may be connected by the lever N' and compelled to yield uniformly to obstructions passing between the rolls, or either shaft and its connected slide be held in fixed position while the other remains free to yield, substantially as described.

32. In a resawing machine, the combination of the frame J, the feed roll slides Q Q mounted thereon, the screw shafts G' G' co-operating with the respective slides, the sleeves M' M' loose upon the respective shafts, the lever N' pivoted to the sleeves M' upon opposite sides of its fulcrum, the rock shaft Q', the rod P' connecting the lever N' to an arm upon said shaft, the weighted arm S' secured upon said shaft, the adjustable collars L' L' upon the shafts G' inside the frame J, the gears K' K' fast upon the shafts outside the frame, and the intermediate stub shaft J' adapted to support a rotary handle H' provided with a gear I' meshing with the gears K' K', substantially as and for the purpose described.

33. In a resawing machine, the combination of a feed roll supporting frame, a pair of transversely movable slides mounted thereon, a pair of transverse rods or shafts capable of slight longitudinal movement with the respective slides, a lever intermediate said shafts and pivotally connected to the same upon opposite sides of its fulcrum, and means for disconnecting the lever at will from either shaft and holding the latter from longitudinal movement, substantially as and for the purpose described.

34. In a resawing machine, the combination of a feed roll supporting frame, a pair of transversely movable slides mounted thereon, a pair of transverse rods or shafts capable of slight longitudinal movement with the respective slides, a pair of sleeves loose upon said shafts, a lever intermediate said shafts and pivoted to said sleeves upon opposite sides of its fulcrum, and means for connecting the sleeves with and disconnecting them from their respective shafts at will, substantially as described.

35. In a resawing machine, the combination of a feed roll supporting frame, a pair of transversely adjustable slides mounted thereon, a pair of rotary screw shafts for adjusting the respective slides and capable of slight longitudinal movement relatively to the frame, a pair of sleeves loose upon said shafts, a weighted or spring-pressed lever pivoted to said sleeves upon opposite sides of its fulcrum, and means for connecting the sleeves with and disconnecting them from their respective shafts at will and for holding either shaft from longitudinal movement relatively to the frame, substantially as described.

36. In a resawing machine, the combination of the frame J, the transversely adjustable roll slides Q Q mounted thereon, the roll stands P P carried by the respective slides, and the weights R R suspended upon the opposite ends of the rope S passing over pulleys T T journaled in the upper ends of the roll stands, substantially as and for the purpose described.

37. In a resawing machine, the combination of the frame J, the transversely adjustable slides Q Q mounted thereon, the roll stands P P carried by the slides, the swiveled frames supported at their lower ends by the slides and at their upper ends by the stands P P, each frame consisting of a vertical plate or bar V and a horizontal laterally projecting plate V' at each end, and the three feed rolls mounted in each frame, the spindles of the front and rear rolls being journaled in bearings in the plates V' and the spindles of the middle rolls passing through the plates and journaled in bearings supported by the stands P P above the upper plates and by the slides Q Q below the lower ones, said middle spindles forming the pivots for the swiveled frames, substantially as described.

38. In a resawing machine, the combination, with the slide Q and the roll stand P carried thereby, of the swiveled frame composed of the vertical plate V and the horizontal end plates V' and caps $V^2$ bolted thereto, the three rolls U, the front and rear ones having the opposite ends of their spindles journaled in bearings in the plates V' and caps V², the thimbles V⁴ clamped between the plates V' and caps V² in line with the spindle of the middle roll, the lower thimble extending down through the slide Q and having its bearing therein, and the upper thimble extending upward through the upper plate V' and cap V² and having its bearing in a support projecting from the roll stand, the spindle of the middle roll having its bearings in the thimbles and projecting below the lower one and having fast upon it a gear by which it is geared to a driving shaft, and the gears C' connecting the spindles of the outer rolls with that of the middle one, substantially as described.

39. In a resawing machine, the combination, with the slide Q and the roll stand P carried thereby, of the swiveled frame composed of the vertical plate V and the horizontal end plates V' and caps V² bolted thereto, the three rolls U, the front and rear ones having the opposite ends of their spindles journaled in bearings in the plates V' and caps V², the thimbles V⁴ clamped between the plates V' and caps V² in line with the spindle of the middle roll, the lower thimble extending down through the slide Q and having its bearing therein, and the upper thimble extending upward beyond the upper plate and its cap and having its bearing in the outer end of the U-shaped strap plate A' bolted to the sides of the roll stand P and an adjustable block V⁷ confined within said plate, the screws B' for adjusting said block, the spindle of the middle roll having its bearings in the thimbles and projecting below the lower ones and having fast upon it a gear by which it is geared to the driving mechanism, and the gears C' inclosed within a depending curtain or flange formed upon the upper plate V' and cap V², for gearing the outer rolls to the middle one, substantially as described.

40. A roll composed of a spindle, a cylindrical shell, and a series of coiled springs interposed between the spindle and shell, the coils of the springs resting in seats upon the spindle and their projecting ends pressing outward against the shell but unattached thereto, whereby the shell is driven by the spindle and can yield to external pressure, substantially as described.

41. A roll composed of a spindle, a cylindrical shell, and a series of coiled springs interposed between the spindle and shell, the coil of each spring resting in a seat upon the spindle, with its projecting ends pressing outward against the shell and one of them abutting against a shoulder or projection upon the inner surface thereof and the other sliding freely thereon, substantially as described.

42. A roll composed of a spindle V⁶, the members U² secured to it and forming the three longitudinal seats, the shell U⁴ having the lugs X² upon its inner surface, and the coiled springs W², each having its coil fitting in one of the concave seats and its ends bearing against the shell U⁴ and one of them abutting against one of the lugs X², substantially as described.

43. A broken live roll, composed of a spindle, a series of cylindrical sections, and a series of coiled springs interposed between the spindle and each section, the coils of said springs resting in seats extending longitudinally of the spindle and their projecting ends bearing against the inner surface of the cylindrical sections, one end of each spring being free to slide upon the surface of the shell and the other not, substantially as described.

44. A broken live roll, composed of a spindle, a series of cylindrical sections, and a series of coiled springs interposed between the spindle and each section, the coils of said springs resting in seats extending longitudinally of the spindle and the projecting ends of each spring bearing against the inner surface of the cylindrical section, one end being free to slide upon such surface and the other abutting against a lug or shoulder thereon, substantially as described.

45. A broken live roll composed of a spindle, a sleeve secured upon the same and provided with a series of longitudinally extending seats, a series of cylindrical sections, and a series of coiled springs interposed between the sleeve and each section, the coils of the springs resting in said seats and the projecting ends of each spring bearing against the inner surface of the section, one being free to slide thereon and the other abutting against a shoulder or projection thereon, substantially as described.

46. The herein described broken live roll, composed of the spindle V⁶, the three part sleeve U² secured thereon and having the three longitudinal concave seats, the series of cylindrical roll sections U⁴ having the lugs X² on their inner surfaces, and the three sets of coiled springs W² within each section, the coils of the two springs in each set confined in one of the seats in the sleeve U², the outer ends of each spring bearing against the inner surface of the section U⁴ and one being free to slide thereon and the other abutting against one of the lugs X², substantially as described.

47. The combination, with a broken live roll composed of a spindle, a series of cylindrical sections, and driving connections between the spindle and the several sections, of means for converting the broken roll at will into a solid one, substantially as described.

48. The combination, with a broken live roll composed of a driving spindle, a series of cylindrical sections, and interposed springs forming the driving connections between the spindle and the several sections, of means for converting the broken roll at will into a solid one, substantially as described.

49. The combination, with a broken live roll composed of a driving spindle, a series of coiled springs interposed between the spindle and the several sections, the coils of said springs resting in seats extending longitudinally of the spindle and their projecting outer ends bearing against the inner surfaces of the cylindrical sections, of means for rigidly connecting the sections and spindle at will to convert the broken roll into a solid one, substantially as described.

50. The combination of a spindle, a sleeve secured upon and movable longitudinally thereof and provided with a series of sets of projecting lugs, a series of cylindrical sections having internal annular flanges which snugly fit around the respective sets of lugs when brought into the same planes, a series of springs interposed between the sleeve and cylindrical sections, and means for moving the sleeve longitudinally of the spindle to bring the sets of lugs within the annular flanges and thereby render the sections rigid relatively to the spindle, substantially as described.

51. The combination of a spindle, a sleeve secured upon and movable longitudinally thereof, said sleeve having a series of longitudinal seats and a series of sets of radially projecting lugs, a series of cylindrical sections having internal annular flanges and a series of lugs or shoulders, said flanges snugly fitting around the respective sets of lugs upon the sleeve when brought into the same planes, a series of coiled springs interposed between each cylindrical section and the sleeve, the coils of the springs fitting in the longitudinal seats in the sleeve and the projecting ends of each spring bearing against the inner surface of the section, one free to slide thereon and the other abutting against one of the lugs thereon, and means for moving the sleeve longitudinally of the spindle to bring its sets of lugs within the internal annular flanges of the respective sections, to render the latter rigid relatively to the spindle, substantially as described.

52. The combination of a spindle, a three part sleeve secured upon and movable longitudinally thereof, the edges of said sleeve portions being rounded out to form three concave seats extending longitudinally of the spindle and each portion having a series of projecting lugs, a series of cylindrical sections having internal annular flanges and a series of lugs or shoulders, said flanges snugly fitting around the respective sets of lugs upon the sleeve when brought into the same plane, a series of coiled springs interposed between each cylindrical section and the sleeve, the coils of the springs fitting in the longitudinal seats in the sleeve and the projecting ends of each spring bearing against the inner surface of the section, one free to slide thereon and the other abutting against one of the lugs thereon, and a nut screwed upon the upper end of the three part sleeve, for lifting it to bring its lugs within the annular flanges of the roll sections, substantially as described.

53. The combination of the spindle $V^6$, the three part sleeve $U^2$ secured thereon by screws passing through longitudinal slots in the sleeve, said sleeve being provided with the lugs $A^3$ arranged in horizontal sets around it, the cylindrical roll sections $U^4$ having the internal annular flanges $Y^2$ and lugs $X^2$, the rings $B^3$ fitting in the upper ends of the sections $U^4$, the coiled springs $W^2$ interposed between the sleeve $U^2$ and sections $U^4$, three or more springs within each section, with their coils fitting in the concave seats in the sleeve $U^2$ and their ends bearing against the inner surfaces of the sections $U^4$, one end of each spring being free to slide upon such surface and the other abutting against one of the lugs $X^2$, and the nut $C^3$ screwed upon the threaded upper end of the three part sleeve $U^2$ and resting upon the ring $B^3$ at the upper end of the upper roll section $U^4$, substantially as and for the purpose described.

54. In a band saw machine, the combination of the hollow supporting column G, the vertically adjustable column $J^3$ fitting therein and carrying the upper saw wheel, the weighted lever $R^3$ having a fixed fulcrum within the column G, the vertical screw shaft $N^3$ flexibly supported upon the inner end of the lever and in turn supporting the column $J^3$, the worm wheel $U^3$ fast upon said shaft, the worm-shaft $V^3$ meshing with the worm-wheel, and a bearing for the inner end of said shaft movable vertically with the screw-shaft $N^3$, whereby the inner end of the worm-shaft may rise and fall with the shaft $N^3$ and remain in mesh with the worm-wheel without binding or friction between the parts.

55. In a band saw machine, the combination of the hollow supporting column G, the vertically adjustable column $J^3$ fitting therein and carrying the upper saw wheel, the weighted lever $R^3$ having a fixed fulcrum within the column G, the strap plates $P^3$ hung upon its inner end, the block $O^3$ carried by said plates, the vertical screw shaft $N^3$ seated at its lower end in the block $O^3$ and having its threaded upper end engaging the column $J^3$, and means for turning the shaft $N^3$, substantially as described.

56. In a band saw machine, the combination of the hollow supporting column G, the vertically adjustable column $J^3$ fitting therein and carrying the upper saw wheel, the nut $M^3$ confined in a recess in the lower end of the column $J^3$, the weighted lever $R^3$ having its inner end forked and fulcrumed on the fixed pins $S^3$ within the column G, the strap plates $P^3$ hung upon the opposite forks of the lever, the block $O^3$ carried by said plates, the vertical shaft $N^3$ seated at its lower end in the block $O^3$ and having its threaded upper end engaging the nut $M^3$, and the worm wheel and shaft for turning the shaft $N^3$, substantially as described.

57. In a band saw machine, the combination of the hollow supporting column G, the vertically adjustable column $J^3$ supported therein and carrying the upper saw wheel and provided with the longitudinal key seat $T^6$, the key $T^5$ fitting in said seat, the handle $T^7$ secured to said key and projecting through an opening in the column G, by moving which laterally the column J³ can be turned in the column G to adjust the angle of the upper saw wheel, and means, as the nut T⁹, for holding the parts in their different adjusted positions, substantially as described.

58. In a band saw machine, the combination of the horizontal frame or arm I³, the upper saw wheel frame G³ pivotally supported at one end of the frame I³, the tubular plug Z³ screwed into the opposite end of the frame I³, and a yielding spring connection between the plug Z³ and frame G³, whereby the saw wheel is permitted to yield to strains against the tension of the spring and whereby the angle of the saw wheel may be adjusted by turning the plug Z³ in the frame I³, substantially as described.

59. In a band saw machine, the combination of the horizontal frame or arm I³, the upper saw wheel frame G³ pivotally supported at one end of the frame I³, the tubular plug Z³ screwed into the opposite end of the frame I³, the rod A⁴ connected to the end of the frame G³ and extending down through the tubular plug Z³, the spring C⁴ surrounding the same and confined within the plug, and means, as the nuts B⁴, for limiting the downward movement of the rod A⁴ under the influence of the spring, substantially as described.

60. In a band saw machine, the combination of the horizontal frame or arm I³ having one of its ends split and provided with a vertical bore, the split bushing Y³ fitted in said bore, the bolt Y⁴ for clamping the bushing in position, the tubular plug Z³ screwed into the bushing Y³, the upper saw wheel frame G³ pivotally supported at the opposite end of the arm I³, the rod A⁴ connected to the frame G³ and extending down through the plug Z³ and having the nuts B⁴ resting upon its upper end, and the coiled spring C⁴ surrounding the rod A⁴ within the plug Z³ and confined by the nut at the lower end of the rod, substantially as and for the purpose described.

61. In a band saw machine, the combination of the horizontal frame or arm I³, the upper saw wheel frame G³ pivotally supported thereon at one end, the eccentric D⁴ mounted in the opposite end of the frame, the depending rod A⁴ having a strap surrounding the eccentric and limited in its downward movement by the arm I³, and means, as the lever G⁴, for turning the eccentric to tilt the frame G³, substantially as described.

62. In a band saw machine, the combination of the horizontal frame or arm I³, the upper saw wheel frame G³ pivotally supported thereon at one end, the eccentric D⁴ mounted in the opposite end of the frame, the depending rod A⁴ having a strap surrounding the eccentric and limited in its downward movement by the arm I³, the lever G⁴ for turning the eccentric, the notched or fluted disk H⁴ turning with it, and the spring detent I⁴ cooperating with the disk, substantially as and for the purpose described.

63. In a band saw machine, the combination of the horizontal frame or arm I³, the upper saw wheel frame G³ pivotally supported thereon at one end, the tubular plug Z³ screwed into the end of the arm I³, the rock shaft E⁴ journaled in the frame G³, the eccentric D⁴ fast thereon, the rod A⁴ having the strap at its upper end surrounding the eccentric and extending at its lower end through the tubular plug Z³, means, as the nuts B⁴, for limiting the downward movement of the rod in relation to the plug, the spring C⁴ surrounding the rod within the plug and confined by the nut on its lower end, and means, as the lever G⁴, for turning the shaft E⁴ and eccentric D⁴, substantially as and for the purpose described.

64. In a band saw machine, the combination of the vertically adjustable horizontal arm I³, the rock shaft G⁵ mounted in the ears H³ thereof, the saw wheel frame G³ pivotally supported at one end upon said rock shaft and adjustable longitudinally thereof, and means intermediate said frame and the arm I³ at its opposite end for adjusting the end of the frame G³ vertically, substantially as and for the purpose described.

HENRY J. GILBERT.

Witnesses:
BERT C. BINGHAM,
JOHN D. MERSHON.